Sept. 18, 1951  G. P. E. HOWARD ET AL  2,568,548
ELECTRIC MOTOR PUMP OF THE SUBMERSIBLE TYPE
Filed April 1, 1946  2 Sheets-Sheet 2

Inventors
G. P. E. Howard
V. Ivanoff
By Robb & Robb
Attorneys

Patented Sept. 18, 1951

2,568,548

UNITED STATES PATENT OFFICE 2,568,548

ELECTRIC MOTOR PUMP OF THE SUBMERSIBLE TYPE

Giles Philip Eliot Howard and Victor Ivanoff, Luton, England

Application April 1, 1946, Serial No. 658,627
In Great Britain February 20, 1945

22 Claims. (Cl. 103—87)

1

This invention relates to electric motors of the submersible type, and refers more particuarly to those submersible motors in which the ambient liquid in which the motor is submerged has access to the interior of the motor casing. The invention also has reference to those arrangements in which a submersible motor forms one structural unit with a submersible pump adapted to be driven by said motor.

It is well known that the low conductivity of water when pure is changed to a higher degree of conductivity when certain chemicals such as common salt are dissolved therein, and that when two dissimilar metals are in contact, when immersed in such impure water, the chemicals may form an electrolyte, and corrosion of one of the metals may be caused.

One object of the invention is the provision of an improved submersible motor of the kind set forth, in which means are provided which will prevent undue corrosion taking place between the bearing housings and the adjacent parts, which means will not deleteriously affect the electrical characteristics of the motor.

Another object is the provision of an improved submersible motor of the kind set forth, and having a squirrel cage rotor, in which means are provided for preventing undue corrosion taking place between the copper of the squirrel cage and the rotor laminations.

Another object is the provision of an improved combination of a submersible motor and a submersible pump, in which the pump is made of corrosion-resisting material such as bronze and undue corrosion is prevented from taking place between the pump and the motor.

Another object is the provision of improvements in the cooling and lubrication of submersible motors of the kind set forth.

Other objects and advantages will appear hereinafter.

In order that the invention may be the more clearly understood a submersible motor and pump combination in accordance therewith will now be described, reference being made to the accompanying drawings in which—

Referring to this drawing the motor, which is of the squirrel cage type, has the usual cylindrical rotor 1 which is surrounded by the usual annular laminated stator 2. The reference 3 designates the copper short circuiting rings of the squirrel cage of the rotor, and the reference 4 designates the windings of the stator. The rotor 1 is integral with the shaft 5 of the motor, and said shaft 5 is direct coupled by means of a coupling 5a to the shaft 6 of the pump, which latter is indicated generally at 7. The motor casing and the pump casing are rigidly connected together as will appear hereinafter. The pump inlet is indicated at 8 and the outlet is by way of an axial hole at 9 at the extreme end of the structure remote from the motor. A flexible delivery tube not shown is attached to the pump outlet and the whole structure is adapted to be suspended, by this delivery tube, into the water to be pumped, with the motor downwards and the pump upwards.

In construction, the stator 2 is encased in a tubular shell 10. The pack of stator laminations are in compression between two apertured end plates 11 and 12, the upper of which 11 bears against a shoulder 13 formed within said shell 10 and the lower of which 12 is maintained in place by means of screws 14. The screws 15, which project into holes in the stator pack are for the purpose of relieving the screws 14 of some of the pressure exerted by said pack.

The shell 10 extends at each end considerably beyond the ends of the stator pack 2 and thus room is afforded within said shell for the stator windings 4. These, in the usual way, pass through longitudinal slots formed through the stator pack 2 and the end plates 11 and 12.

At its two ends the shell 10 is secured to two housings 16 and 17 for the bearings of the shaft 5. The upper housing 16 comprises a tubular portion 18 surrounding said shaft 5 and having its lower end fairly close to the upper end of the stator, and an annular flange portion 19 extending outwardly from the upper end of said tubular portion and secured, as will hereinafter appear, to the upper end of said shell 10. The lower part of said tubular portion 18 is cylindrical and has mounted within it a bearing bush 20 in which bears a sleeve 21 which is fast on the shaft 5. The upper part of said tubular portion 18 is slightly conical so that its diameter increases to its upper end where it joins the flange portion 19.

The lower housing 17 comprises a tubular portion 22 surrounding said shaft 5 and having its upper end fairly close to the lower end of the stator, and an annular flange portion 23 extending outwardly from the lower end of said tubular portion and secured, as will hereinafter appear to the lower end of the shell 10. This annular flange portion 23 is of considerable axial extent and extends as shown downwards from said tubular portion 22. The upper part of said tubular portion 22 is cylindrical and has mounted within it a bearing bush 24 in which bears a sleeve 25 which is fast on the shaft 5. The lower part of said tubular portion is slightly conical so that its diameter increases to its lower end where it joins the flange portion 23.

The lower end of the pump casing 26 is secured to the upper end of the shell 10 so that said casing forms a continuation of said shell. Thus said shell 10 at its upper end has an inwardly extending annular flange 27 welded to it, and the lower surface of the flange portion 19 rests flush against the upper surface of this flange 27. The lower end of the pump casing 26 rests flush against the upper surface of said flange portion 19, and the three parts, that is to say the pump casing 26, the bearing housing 16 and the stator shell 10 are secured together by means of a number of bolts 28 which pass through lugs 29 on the outside of said pump casing 26 and through the flange portion 19, and which screw into the flange 27, all as clearly shown.

Figure 1A:
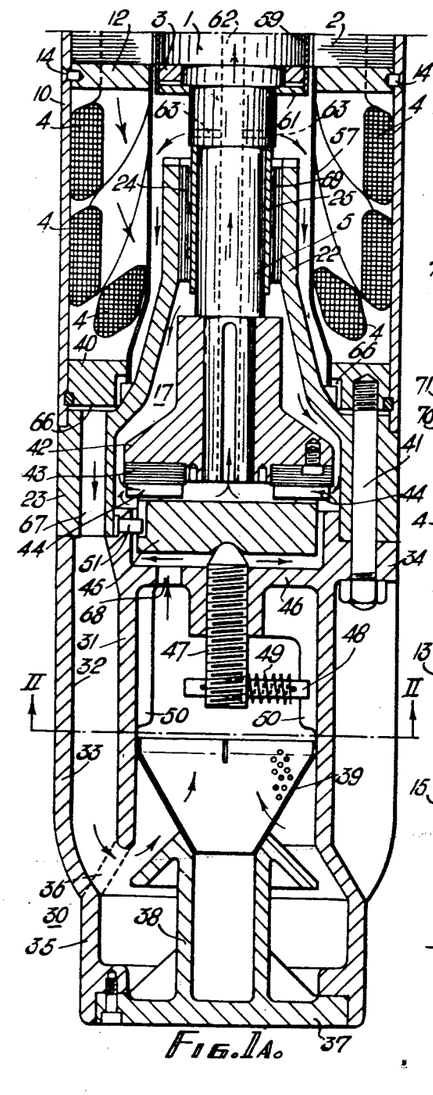
Figures 1A, 1B and 1C are contiguous portions of a continuous sectional elevation of said combination.
Figure 1B:
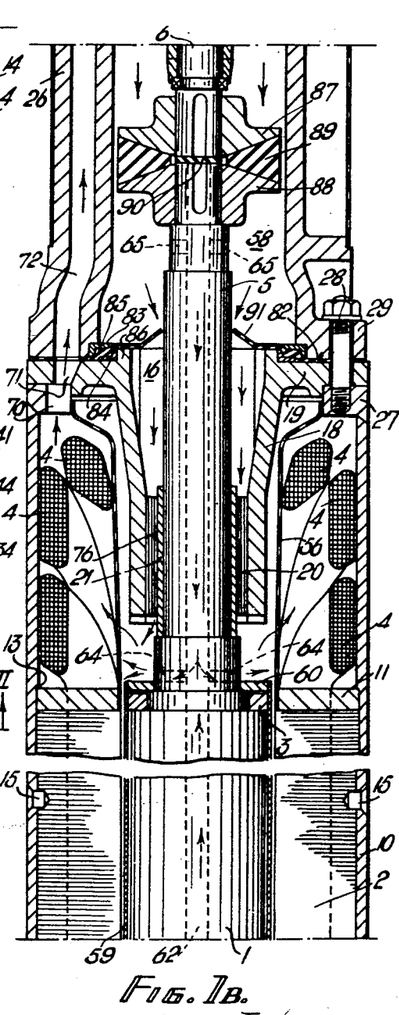
Figure 1C:
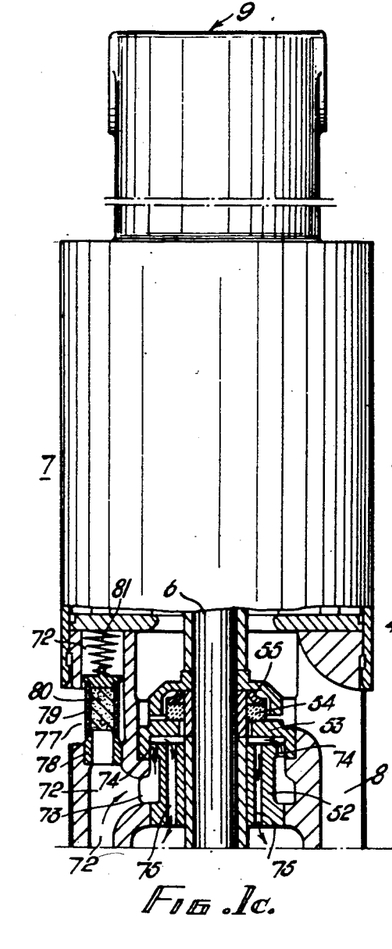
Figure 2:
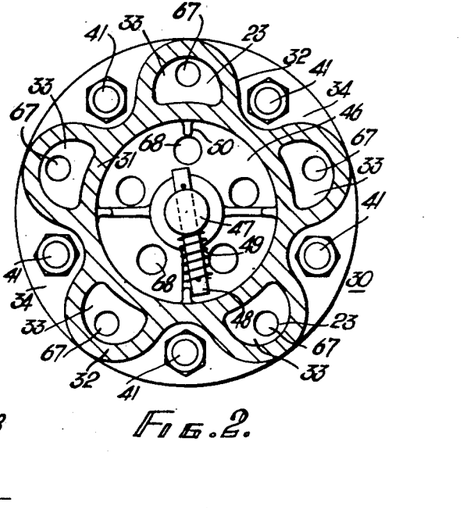
Figure 2 is a cross section on line II—II of Figure 1A.

Secured with its upper end against the lower surface of the flange portion 23 is a so-called skid ring 30. This skid ring is of generally cylindrical form, and, throughout the major portion of its length from the upper end it has, as shown in Figures 1A and 2, an inner wall 31 which is substantially cylindrical, and a surrounding outer wall 32 which is longitudinally corrugated and has its corrugation gulfs merging into the inner wall 31, whereby a number of longitudinal passages 33 are formed between the two walls. At its upper end said skid ring is formed with an interrupted flange 34 which extends only across the corrugation gulfs, and thus leaves the upper ends of the passages 33 open. At their lower ends the corrugated outer wall 32 and the cylindrical inner wall both merge into a single short cylindrical wall 35 in a manner which will be clear from Figure 1A. Openings 36 are formed whereby the lower ends of the passages 33 communicate freely with the inside of said wall 35 and therefore with the inside of the inner wall 31. It will be seen that the diameter of the short cylindrical wall 35 is about mid-way between the diameter of the corrugation crests and the diameter of the corrugation gulfs of the outer wall 31.

The lower end of the short cylindrical wall 35 is closed by means of a bottom closure element 37. Said closure element 37 has a short hollow column 38 extending upwardly therefrom and carrying at its upper end a coned sand filter 39 which expands outwardly and upwardly from said column and whose upper edge engages the inner periphery of the wall 31 as shown.

For securing the shell 10, the lower housing 17 and the skid ring 30 together, a securing ring 40 is attached to the inner periphery of said shell close to the bottom thereof, as will be clear from Figure 1A, and a number of bolts 41 are passed through the interrupted flange 34 of the skid ring and through the flange portion 23 of the lower housing 17 and are screwed into said securing ring 40.

The end thrust exerted by the pump rotor is in a downward direction and is transmitted from the pump shaft 6 to the motor shaft 5. For supporting the end thrust, said shaft 5 at its lower end has an end element 42 keyed thereon, which element carries on its under surface an end thrust bearing element 43. This bearing element is supported by a ring of corresponding stationary bearing elements 44 of the Michelle or tilting type, and said elements 44 are in turn supported on the upper surface of a circular thrust plate 45 which is supported so as to be capable of tilting in a universal manner about its centre.

For thus supporting said thrust plate 45, a horizontal partition 46 having a central boss is formed within and across the inner cylindrical wall 31 of the skid ring near the upper end thereof, and a screw 47 is screwed through said boss with its upper end projecting to the upper side of said partition. This screw has its upper end coned and rounded, and said coned upper end engages in a corresponding coned and rounded recess in the centre of the under side of said thrust plate 45.

It will be seen that, by adjusting said screw 47, axial adjustment is effected of the whole rotatable unit comprising the motor and pump shafts and their rotors. Thus, by adjusting said screw, the correct axial correlation between the rotor and stator of the pump may be obtained.

For effecting the axial adjustment of said screw 47 and ensuring that it will remain fixed at any given adjustment to which it is set, a tommy bar 48 is provided which passes through a diametrical hole at the lower end of said screw. This tommy bar is longitudinally slidable in said diametrical hole, and is biased by means of a coil spring 49 to a normal limiting position shown, at which its effective length is a maximum. A number of longitudinal ribs 50 are formed on the inner periphery of the wall 31 at spaced intervals around said wall, and, when said tommy bar 48 is at its said normal limiting position, its end will lie between an adjacent pair of said ribs, and said screw 47 will be prevented from rotating. To adjust said screw, said tommy bar 48 is pressed in opposition to said spring 49 to a position at which its end clears said ribs 50, and the screw 47 is rotated as required, said tommy bar returning to the normal position between a pair of the ribs when the adjustment is correct.

It will be seen that the thrust plate 45 is prevented from rotating, while being capable of tilting and of being axially adjusted, by means of a number of studs 51 carried by the inner wall 31 of the skid ring and engaging in slots in the periphery of the thrust plate 45 parallel to the axis.

It will be seen that stator windings 4 above and below the stator laminations are kept in place and protected by means of two tubular sheaths 56 and 57. The upper sheath 56 has its upper end secured around the inner periphery of the flange 27 and its lower end secured around the inner periphery of the end plate 11. The lower sheath 57 has its upper end secured around the inner periphery of the end plate 12 and its lower end secured around the inner periphery of the securing ring 40. These sheaths 56 and 57 are perforated.

The reference 52 designates the bearing for the pump shaft 6. This is secured to the inside of the pump casing at the lower end of the pump shaft 6 below the impeller. Just above said bearing 52 is a fixed plate 53 whose outer periphery is sealed around the inner periphery of the pump casing and whose inner periphery is clear of the pump shaft 6, and immediately above said fixed plate is a carbon ring 54. This carbon ring is pressed downwardly against the fixed plate 53 by means of a spring device 55 mounted on the shaft 6 and thus makes a fluid-tight seal around the shaft 6 and thus the whole of the water being handled by the pump is kept by said carbon ring 54 and said fixed plate 53 away from the bearing 52 and everything therebelow.

The rotor 1 of the motor is completely encased in a steel casing which isolates it from the water which, as will hereinafter appear, is in the shell 10. Thus a tubular steel shell 59 fits closely on said rotor 1 and extends at each end beyond the short circuiting rings 3 of the squirrel cage. Two annular end discs of steel 60 and 61 have their outer peripheries welded around the respective ends of said shell 59 and their inner peripheries welded around the shaft 5 and thus, as stated, the rotor 1 including the squirrel cage elements is fully enclosed and sealed.

The whole of the enclosure, constituted by the skid ring 30, the motor shell 10 and the portion of the pump casing below the ring 54 and plate 53, is filled with water which normally, as will hereinafter appear, includes an admixture of the ambient water in which the assembly is submerged. Means are provided, as will now be described, whereby this enclosed volume of water is continuously circulated for the purpose of cooling and lubricating the bearings and cooling other parts such as the rotor and stator and the stator windings.

Thus an axial bore hole 62 is formed through the motor shaft 5 from end to end. The lower end of this bore hole is open and the upper end is closed by the coupling 58. Just beneath the rotor 1, radial holes 63 extend from this bore hole 62 to the periphery of the shaft, and it will be seen that the shaft at this region is relatively thick so that the radial holes 63 are long enough for the water in them to develop a considerable centrifugal head. Just above the rotor 1, radial holes 64 extend from said bore hole 62 to the periphery of the shaft, and it will be seen that the shaft at this region also is relatively thick. Finally, just below the flexible coupling 58, radial holes 65 extend from said bore hole 62 to the periphery of the shaft, and it will be seen that the shaft at this region is relatively thin so that the centrifugal head developed in said holes 65 is small.

The following circulation circuits can now be traced:

First the water will flow from the lower end of the bore hole 62 up to the radial holes 63, and owing to the centrifugal head in said holes, some of the water will flow outwardly through them. Some of the water having left said holes 63 will flow downwardly on the outside of the tubular portion 22 of the lower housing 17, and through slots 66 formed in the securing ring 40, to and through holes 67 which are formed in the flange portion 23 of said lower housing in alignment with the respective passages 33 in the skid ring, through said passages 33 and the openings 36 into the lower portion of the skid ring. The stream will then turn upwardly and flow through the sand filter 39, and then through holes 68 in the partition 46 and around the thrust plate 45 to the outside of the bearings 44 and 43. From there the stream will turn inwardly through the spaces between the tilting pad bearings 44 back to the lower end of the bore hole 62.

A further portion of the water having left the radial holes 63 will flow downwardly between the bearing bush 24 and the sleeve 25, said bush to this end being formed with a spiral groove 69. This stream will then flow between the housing 17 and the element 42 and then inwardly through the spaces between the bearings 44 to the lower end of the bore hole 62 as before.

Some of the water flowing up the bore hole 62 will pass the radial holes 63 and will continue up to the radial holes 64 and will flow out through these radial holes 64 by centrifugal force as before. Some of the water having left the radial holes 64 will then flow downwardly through the clearance between the rotor sleeve 59 and the stator pack 2 and will join the stream having left the radial holes 63.

A further portion of the stream having left the radial holes 64 will flow through the perforations in the sheath 56 and around the stator windings, and some of the water around said stator windings will flow downwards through the slots in the stator stack which receive said stator windings. This stream will flow from the lower end of said slots around the lower portion of the stator windings and then will pass through the perforations in the sheath 57 to join the stream on the outside of the bearing housing 17.

A further portion of the stream around the stator windings at the upper end will flow upwardly, and will flow through apertures 70 in the flange 27 and registering apertures 71 in the flange portion 19 into registering longitudinal conduits 72 in the thickness of the wall of the pump casing. These longitudinal conduits 72 lead to an annular space 73 surrounding the pump bearing 52, and from this space the water will flow through slots 74 in the bearing 52 to the upper end of said bearing just beneath the fixed plate 53. From there the water will flow downwardly through longitudinal holes 75 in said bearing 52, and thence around the shaft coupling 58 and down within the tubular portion 18 of the upper housing 16 and between the bearing bush 20 and the sleeve 21, said bearing bush being formed with a spiral groove 76 for giving passage to this water. The water emerging at the lower end of this bearing bush will mingle with one or other of the streams leaving the radial holes 64.

A portion of the stream having flowed downwardly around the shaft coupling 58 will flow inwardly through the radial holes 65 and will then flow downwardly through the bore hole 62 as far as the radial holes 64 through which it will flow outwardly and join one or other of the streams already traced.

As previously stated, the whole enclosure, constituted by the skid ring 30, the motor shell 10 and the portion of the pump casing below the ring 54 and the plate 53, is filled with water. Before the assembly is lowered into the water which is to be pumped, this enclosure is filled with tap water. To enable this to be done, one of the conduits 72 is extended upwardly beyond the point where it joins the annular space 73, and an opening 77 is made in the wall of the pump casing through which this upwardly extending portion communicates with the outside. In the lower end of this extending portion of the conduit 72 is mounted a bush 78, and a porous element consisting of a perforated metal tube 79 with a porous mass 80 (say sintered bronze) within it is located in this extending portion above the bush 78 and is biased downwardly on to said bush by means of a spring 81. When said porous element is seated on said bush it closes the opening 77 and water therefore can only enter or leave the enclosed system through the porous element. In other words it will not flow easily. Means, however, are provided whereby said porous element can be pressed upwardly in opposition to said spring 81 so that it leaves said bush 78 and the system can then be filled with tap water as stated.

In operation the system is filled with tap water in this way and the porous element is then permitted to seat on the bush and the assembly is submerged. When the motor is started the consequent rise in temperature of the water in the enclosure produces an increase in volume and a certain percentage will pass out through the porous element 79, 80. When the motor subsequently stops and the water in the enclosure cools, the consequent reduction in volume will cause a certain amount of the ambient water to seep in through said porous element 79, 80. It will be clear that, after the motor has been started and stopped a considerable number of times, there will be an appreciable admixture of the ambient water with the tap water with which the enclosure was originally filled, and the enclosed water will contain an appreciable quantity of the impurities in solution in the said ambient water.

Owing to these impurities which are liable to be in the water both on the inside and on the outside of the assembly, there is danger that, if the assembly should comprise two dissimilar metals in contact with each other and with the water, either inside or outside, electrolytic corrosion of one of the metals would be caused. It is unavoidable that the stator pack and the rotor shall be of soft iron or other high permeability material, and thus to avoid electrolytic corrosion it is desirable that all other parts of the motor assembly should be of a metal having the same order of electromotive force against a standard cell such for example as steel or cast iron. All static parts, however, which are of magnetic material and are relatively close to the stator windings 4 have eddy currents induced in them by the alternating current in said windings, and this gives rise to considerable losses. To avoid, or at least to reduce, these losses, and at the same time avoid electrolytic corrosion, we make at least some of the static parts adjacent to the stator windings of non-magnetic cast iron or other low permeability material having the same order of electromotive force as steel or cast iron. In the particular construction being described it is not deemed practicable to make the stator shell 10 of such material, but we make the two bearing housings 16 and 17 of such material, for example nickel cast iron.

It will be appreciated that, by enclosing the rotor, in the manner heretofore described, by means of the steel shell 59 and the annular discs 60 and 61, the water within the assembly is kept completely out of contact with the copper squirrel cage elements and therefore no electrolytic corrosion can take place owing to the necessary contact between these copper elements and the main bulk of the rotor.

As stated, the various parts of the motor assembly are all of iron or steel. In the present construction we make the whole of the pump of corrosion resisting material such as bronze and, in order to prevent the presence of electrolytic corrosion owing to the contact of the bronze of the pump casing and shaft with the motor casing and shaft said pump casing is insulated from the motor casing and said pump shaft is insulated from said motor shaft.

For insulating the pump casing 26 from the flange portion 19 of the upper bearing housing, an insulating gasket 82 is interposed between the upper surface of said flange portion and the under surface of the pump casing as shown, and the bolts 28 are insulated from the lugs 29.

It is also necessary to register the pump casing 26 accurately with respect to the upper bearing housing 16, and this must be effected without establishing electrical connection between the two parts. For this purpose we provide two L section metal rings 83 and 84 which are fitted as shown one each side of an insulating ring 85 of insulating material such as Bakelite so that the ring 83 mates with the upper and outer surfaces of said insulating ring and the ring 84 mates with the under and inner surface. The dimensions are such that the rings 83 and 84 are held out of contact with each other by the insulating ring 85. The composite ring constituted by the three rings 83, 84 and 85 fits closely round an accurately machined centre boss 86 on the bearing housing 16 and also fits closely within an accurately machined countersunk recess in the pump casing 26 as will be clear from the drawing, and thus said housing 16 and pump casing 26 are accurately registered axially.

For insulating the pump shaft 6 from the motor shaft 5, the coupling 58 comprises two metal elements 87 and 88 keyed on to the ends of the respective shafts and connected by means of a rubber ring 89 located between and bonded to said two elements. As shown the rubber ring 89 has both its upper and lower surface concavely coned and the lower and upper surfaces of the elements 87 and 88 are correspondingly convexly coned. An insulating disc 90 is located between the ends of the two shafts for the purpose of unyieldingly receiving the end thrust of the shaft 6 on the shaft 5. This disc may be of fabric Bakelite.

The reference 91 designates a coned baffle which is mounted on the upper end of the bearing housing 16 and has its inner edge fairly close to the surface of the motor shaft 5. The purpose of this is to prevent scale and grit from falling to the inside of said bearing housing 16 and reaching the bearings. The clearance of said baffle 91 around the pump shaft is adequate to enable the water to flow down to the inside of said bearing housing.

What we claim and desire to secure by Letters Patent is:

1. A submersible motor structure comprising an elongated enclosed cylindrical shell structure which will be assumed vertical, a shaft rotatably mounted coaxially within said shell structure, a squirrel cage rotor on said shaft, a stator surrounding said rotor and secured around the inner periphery of said shell structure, windings for said stator extending longitudinally through slots therein and above and below the ends of said stator, said shell structure being adapted to be filled with water, and means for establishing communication between the water within said shell structure and the ambient water surrounding said shell structure and vice versa, so that said shell structure is adapted to contain at least an admixture of said ambient water, said shaft having a longitudinal bore hole extending therein from the lower end, and having lateral holes extending from said longitudinal bore hole to the surface of said shaft at two different levels above the upper end of said rotor, the shaft at the lower of said two levels being of greater diameter than at the upper of said two levels, so that the centrifugal head in the lower lateral hole is greater than that in the upper lateral hole, whereby water will circulate up said longitudinal bore hole and out through the lower of said lateral holes, part of the water from said lower lateral hole flowing down through the clearance between said rotor and said stator and also through the longitudinal stator slots for the stator windings, back to the lower end of said longitudinal bore hole, and part of the water from said lower lateral hole flowing up and then in through the upper lateral hole and down the longitudinal bore hole and again out through the lower lateral hole, so that the portions of the stator windings extending above and below the stator are adequately cooled.

2. A submersible motor structure comprising an elongated enclosed cylindrical shell structure which will be assumed vertical, a shaft rotatably mounted coaxially within said shell structure, a squirrel cage rotor on said shaft, a stator surrounding said rotor and secured around the inner periphery of said shell structure, windings for said stator extending longitudinally through slots therein and above and below the ends of said stator, said shell structure being adapted to be filled with water, and means for establishing communication between the water within said shell structure and the ambient water surrounding said shell structure and vice versa, so that said shell structure is adapted to contain at least an admixture of said ambient water, said shaft having a longitudinal bore hole extending therein from the lower end, and having lateral holes extending from said longitudinal bore hole at two different levels above the upper end of said rotor and at a level below the lower end of said rotor, the shaft at the uppermost of said three levels being of less diameter than at the other two levels so that the centrifugal head in the uppermost lateral hole is less than in the other lateral holes, whereby water will circulate up the longitudinal bore hole and out through the lowermost lateral hole and back to the lower end of said longitudinal bore hole, and also up said longitudinal bore hole and out through the intermediate lateral hole, part of the water from said intermediate lateral hole flowing down through the clearance between said rotor and stator and also through the longitudinal stator slots for the stator winding, back to the lower end of the longitudinal bore hole, and part of the water from said intermediate lateral hole flowing up and then in through the upper most lateral hole and down the longitudinal bore hole and again out through the intermediate lateral hole, so that the portions of the stator windings extending above and below the stator are adequately cooled.

3. A submersible motor and pump combination, comprising an elongated cylindrical shell structure which will be assumed vertical, said structure having its lower end closed, a shaft coaxial within said shell structure, a squirrel cage rotor on said shaft, a stator surrounding said rotor and secured around the inner periphery of said shell structure, windings for said stator extending longitudinally through slots in said stator and extending above and below the ends of said stator, motor bearings for said shaft above and below the upper and lower ends of said rotor, housings for said bearings each extending outwardly from its bearing and being secured around said shell structure, a pump impeller on said shaft above the upper motor bearing, a pump bearing for said shaft mounted within said shell structure between said pump impeller and said upper motor bearing, a partition between said impeller and said pump bearing, said partition dividing said shell structure and being sealed around said pump shaft, whereby the shell structure portion beneath said partition forms an enclosure adapted to be filled with water, said shaft having a longitudinal bore hole extending therein from the lower end, and having lateral holes extending from said bore hole to the surface of said shaft at a level between the rotor and the upper motor bearing and at a level between the upper motor bearing and the pump bearing, said shaft at the lower of said two levels being of greater diameter than at the upper of said two levels, so that the centrifugal head in the former lateral hole is greater than that in the latter, a closed conduit extending from the space beneath the upper bearing housing and the space between the pump bearing and said partition, said pump bearing having a passage through it from the upper to the lower end, whereby water will circulate up said longitudinal bore hole and out through the lower of said lateral holes, part of the water from said lower lateral hole flowing down through the clearance between said rotor and said stator and also through the longitudinal stator slots for the stator windings, back to the lower end of said longitudinal bore hole, and part of the water from said lower lateral hole flowing up through said conduit to the space between said pump bearing and said partition and down through said pump bearing and then in through the upper lateral hole and down the longitudinal bore hole and again out through the lower lateral hole.

4. A submersible motor structure comprising an elongated enclosed cylindrical shell structure which will be assumed vertical, a shaft rotatably mounted coaxially within said shell structure, a squirrel cage rotor on said shaft, a stator surrounding said rotor and secured around the inner periphery of said shell structure, windings for said stator extending longitudinally through slots therein and above and below the ends of said stator, said shell structure being adapted to be filled with water, said shaft having a longitudinal bore hole extending therein from the lower end, and having a lateral hole extending from said longitudinal bore hole to the surface of said shaft at a level above the upper end of said rotor whereby, owing to the centrifugal head in said lateral hole, water will circulate up said longitudinal bore hole and out through said lateral hole, and down through the clearance between said rotor and said stator and also through the longitudinal stator slots for the stator windings back to the lower end of said shell structure, and thence to the lower end of said bore hole, said shell structure near its lower end having its circumferential wall formed with longitudinal corrugations, an inner circumferential wall merging with the gulfs of said corrugations so as to form a plurality of longitudinal channels, and means for guiding the down-flowing water to flow through said longitudinal channels, whereby it gives up its heat readily to the ambient liquid outside said shell structure.

5. A submersible motor and pump combination, comprising an elongated cylindrical shell structure which will be assumed vertical, said structure having its lower end closed, a shaft coaxially within said shell structure, a squirrel cage rotor on said shaft, a stator surrounding said rotor and secured around the inner periphery of said shell structure, windings for said stator extending longitudinally through slots in said stator and occupying spaces above and below the ends of said stator, motor bearings for said shaft above and below the upper and lower ends of said rotor, housings for said bearings each extending longitudinally and outwardly from its bearing in a direction away from said rotor, and being joined to said shell structure at its end remote from said rotor, a pump impeller on said shaft above the upper motor bearing, a pump bearing for said shaft mounted within said shell structure between said pump impeller and the upper motor bearing, a partition between said impeller and said pump bearing, said partition dividing said shell structure and being sealed around said pump shaft, whereby the shell structure portion beneath said partition forms a liquid enclosure, an inlet and an outlet for said pump both above said partition, whereby the liquid passing through said pump is kept from the liquid within said enclosure, a hole extending up the motor shaft from its lower end, a first lateral hole extending outwardly from said axial hole to the surface of said shaft at a region between the lower motor bearing and the rotor, a second lateral hole extending outwardly from said axial hole to the surface of said shaft at a region between the upper motor bearing and the rotor, a communication hole affording communication from the upper side to the lower side of the lower bearing housing, a surface groove formed between each motor bearing and the shaft, a third lateral hole extending from said axial hole to the surface of said shaft at a region between the pump bearing and the upper motor bearing, at which region the diameter of said shaft is smaller than at the regions of the first and second radial holes, a closed conduit extending from the space beneath the upper bearing housing and the space between the pump bearing and said partition, and a passage through said pump bearing from the upper to the lower end thereof, whereby the liquid in the aforesaid enclosure flows up said longitudinal bore hole and out through the first lateral hole and back to the lower end of said longitudinal bore hole, in part through said communication hole and in part through the surface groove between the lower motor bearing and the shaft, and also up said longitudinal bore hole and out through the second lateral hole, part of the water from said second lateral hole flowing down through the clearance between said rotor and stator and also through said longitudinal stator slots for the stator winding, and through said communication hole back to the lower end of said bore hole, and part of the water from said second lateral hole flowing through said closed conduit to said space between said pump bearing and said partition and through said passage in said pump bearing, and in part in through said third lateral hole and down said longitudinal bore hole to said second lateral hole, and in part down through the surface groove between the upper motor bearing and the shaft.

6. A submersible motor structure comprising an elongated cylindrical shell structure, a shaft rotatably mounted coaxially within said shell structure, a squirrel cage rotor on said shaft a stator surrounding said rotor and secured around the inner periphery of said shell structure, windings for said stator extending beyond the ends of said stator, motor bearings for said shaft beyond the ends of said rotor, housings for said bearings each extending outwardly from its bearing and being secured around said shell structure, said shell structure being adapted to be filled with water, and means for establishing communication between the water within said shell structure and the ambient water surrounding said shell structure and vice versa, so that said shell structure is adapted to contain at least an admixture of said ambient water, said stator and rotor and the major part of the structure being made of magnetic metal and said bearing housings being made of low permeability metal which is of the same order of electromotive force as said magnetic metal forming the major part of the structure, whereby said housings do not deleteriously affect the function of the motor and at the same time electrolytic action between said housings and the contiguous parts is prevented.

7. A submersible motor structure comprising an elongated cylindrical shell structure, a shaft rotatably mounted coaxially within said shell structure, a squirrel cage rotor on said shaft, a stator surrounding said rotor and secured around the inner periphery of said shell structure, windings for said stator extending beyond the ends of said stator, motor bearings for said shaft beyond the ends of said rotor, said bearings being relatively close to the ends of said rotor, housings for said bearings, each extending outwardly from its bearing and in a direction away from the rotor and being secured around said shell structure, whereby portions of the stator windings lie around the outside of said bearing housings, said shell structure being adapted to be filled with water, and means for establishing communication between the water within said shell structure and the ambient water surrounding said shell structure and vice versa, so that said shell structure is adapted to contain at least an admixture of said ambient water, said stator and rotor and the major part of the structure being made of magnetic metal and said bearing housings being made of low permeability metal which is of the same order of electromotive force as said magnetic metal forming the major part of the structure, whereby said housings do not deleteriously affect the function of the motor and at the same time electrolytic action between said housings and the contiguous parts is prevented.

8. A submersible motor structure comprising a housing adapted to contain cooling liquid, a rotor part rotatable within said housing, a hole in said rotor part extending longitudinally of the axis thereof, an outlet hole extending from said longitudinal hole to the periphery of said rotor part, an inlet hole extending from said longitudinal hole to the periphery of said rotor part, said outlet and inlet holes being spaced from each other along said longitudinal hole, and said rotor part being of greater radius at the region of said outlet hole than at the region of said inlet hole, so that the centrifugal head developed in said outlet hole is greater than that developed in said inlet hole, and cooling liquid flows out from said longitudinal hole by way of said outlet hole and into said longitudinal hole by way of said inlet hole.

9. A submersible motor structure comprising a housing adapted to contain cooling liquid, a rotor part rotatable within said housing, a hole in said rotor part extending longitudinally of the axis thereof, said hole being open at one end of said rotor part, an outlet hole extending from said longitudinal hole to the periphery of said rotor part, an inlet hole extending from said longitudinal hole to the periphery of said rotor part, said outlet and inlet holes being spaced from each other along said longitudinal hole, and said rotor part being of greater radius at the region of said outlet hole than at the region of said inlet hole, so that the centrifugal head developed in said outlet hole is greater than that developed in said inlet hole, and cooling liquid flows out from said longitudinal hole by way of said outlet hole and into said longitudinal hole by way of both said inlet hole and the open end of said longitudinal hole.

10. A submersible motor structure comprising a housing adapted to contain cooling liquid, a rotor part rotatable within said housing, a hole in said rotor part extending longitudinally of the axis thereof, said hole being open at one end of said rotor part, an outlet hole extending from said longitudinal hole to the periphery of said rotor part, an inlet hole extending from said longitudinal hole to the periphery of said rotor part, said outlet and inlet holes being spaced from one another along said longitudinal hole, with said outlet hole between said inlet hole and the open end of said longitudinal hole, and said rotor part being of greater radius at the region of said outlet hole than at the region of said inlet hole, so that the centrifugal head developed in said outlet hole is greater than that developed in said inlet hole, and cooling liquid flows out from said longitudinal hole and then divides and flows in opposite directions and rejoins said longitudinal hole by way of both said inlet hole and the open end of said longitudinal hole.

11. A submersible motor structure comprising a housing adapted to contain a cooling liquid, a shaft rotatable within said housing, a rotor on said shaft, a stator surrounding said rotor and secured to said housing, stator windings passing longitudinally through slots in said stator and extending beyond the ends of said stator, a longitudinal hole in said shaft, said hole being open at one end of said shaft, a first outlet hole extending from said longitudinal hole to the periphery of said shaft at a point beyond the end of said rotor remote from the open end of said longitudinal hole, a second outlet hole extending from said longitudinal hole to the periphery of said shaft at a point between said rotor and the open end of said longitudinal hole, whereby cooling liquid, owing to the centrifugal head in said outlet holes is adapted to flow from said longitudinal hole out of both of said outlet holes and to return to said longitudinal hole at the said open end thereof, the cooling liquid from said first outlet hole flowing through the clearance between said rotor and said stator and around the adjacent stator winding ends and through the stator slots, and the cooling liquid from said second outlet hole flowing around the adjacent stator winding ends.

12. A submersible motor structure comprising a housing adapted to contain a cooling liquid, a shaft rotatable within said housing, a rotor on said shaft, a stator surrounding said rotor and secured to said housing, bearings for said shaft beyond the ends of said rotor, bearing housings extending outwardly from said bearings respectively and secured to the wall of said housing, a longitudinal hole in said shaft, said hole being open at one end of said shaft, an outlet hole extending from said longitudinal hole to the periphery of said shaft at a point between said rotor and the one of said bearings which is remote from the open end of said longitudinal hole, an inlet hole extending from said longitudinal hole to the periphery of said shaft at a point on the far side of the last named one of said bearings, said shaft being of greater radius at the region of said outlet hole than at the region of said inlet hole, so that the centrifugal head developed in said outlet hole is greater than that developed in said inlet hole, and so that cooling liquid flows out from said longitudinal hole by way of said outlet hole, and into said longitudinal hole by way of both said inlet hole and the open end of said longitudinal hole.

13. A submersible motor structure comprising a housing adapted to contain a cooling liquid, a shaft rotatable within said housing, a rotor on said shaft, a stator surrounding said rotor and secured to said housing, bearings for said shaft beyond the ends of said rotor, bearing housings extending outwardly from said bearings respectively and secured to the wall of said housing, a longitudinal hole in said shaft, said hole being open at one end of said shaft, a first outlet hole extending from said longitudinal hole to the periphery of said shaft at a point between said rotor and the one of said bearings which is remote from the open end of said longitudinal hole, a second outlet hole extending from said longitudinal hole to the periphery of said shaft at a point between said rotor and the other of said bearings, an inlet hole extending from said longitudinal hole to the periphery of said shaft at a point on the remote side of the first named one of said bearings, said shaft being of greater radius at the region of said outlet holes than at the region of said inlet hole, so that the centrifugal head developed in said outlet holes is greater than that developed in said inlet hole, and so that cooling liquid flows out from said longitudinal hole by way of both outlet holes and flows into said longitudinal hole by way of said inlet hole and also the open end of said longitudinal hole.

14. A submersible motor and pump combination comprising an outer cylindrical shell having one end closed, a motor shaft and a pump shaft mounted coaxially end to end in said shell and connected to form a single unit, with said motor shaft at the closed end of said shell, a rotor on said motor shaft, a stator surrounding said rotor and secured to said shell, bearings for said motor shaft beyond the ends of said rotor and housings for said bearings each extending outwardly from its bearing and secured around said shell structure, a pump impeller on the pump shaft, a partition sealed around the pump shaft and dividing said shell between the rotor and the pump impeller, and forming an enclosed space in said shell adapted to contain a cooling liquid, a bearing for the pump shaft between said partitions and the rotor, a longitudinal hole in said motor shaft, said hole being open at the end of the shaft adjacent the closed end of said shell, an outlet hole extending from said longitudinal hole to the periphery of said motor shaft at a point between said rotor and the one of the motor bearings which is remote from the closed end of the shell, an inlet hole extending from said longitudinal hole to the periphery of said motor shaft at a point between the last named one of said motor bearings and said partition, said motor shaft being of greater radius at the region of said outlet hole than at the region of said inlet hole, so that the centrifugal head developed in said outlet hole is greater than that developed in said inlet hole, and so that cooling liquid flows out from said longitudinal hole by way of said outlet hole, and into said longitudinal hole by way of both said inlet hole and the open end of said longitudinal hole.

15. A submersible motor structure comprising a housing, a motor stator and a motor rotor enclosed within said housing, means for initially filling said housing with water, and a filter of sintered bronze mounted in said housing for enabling the water within said housing to pass to the ambient water outside and vice versa, whereby said housing will remain filled with water despite the expansion and contraction of the enclosed water owing to heating and cooling.

16. A submersible motor structure, comprising a housing, a motor stator and a motor rotor enclosed within said housing, an opening in the wall of said housing, and a filter element mounted on said housing so as to be movable to and from an obstructing position at which it obstructs, and a non-obstructing position at which it does not obstruct, said opening, whereby said housing is adapted to be initially filled with water through said opening when said filter element is in its non-obstructing position, and the water in said housing is enabled to pass to the ambient water outside and vice versa when said filter element is at its obstructing position, so that said housing will remain filled with water despite the expansion and contraction of the enclosed water owing to heating and cooling.

17. A submersible motor structure, comprising a housing, a motor stator and a motor rotor enclosed within said housing, an opening in the wall of said housing, and a filter element mounted on said housing so as to be movable to and from an obstructing position at which it obstructs, and a non-obstructing position at which it does not obstruct, said opening, whereby said housing is adapted to be initially filled with water through said opening when said filter element is at its non-obstructing position, and the water in said housing is enabled to pass to the ambient water outside and vice versa when said filter element is at its obstructing position, so that said housing will remain filled with water despite the expansion and contraction of the enclosed water owing to heating and cooling, said filter element being biased to its obstructing position.

18. A submersible motor and pump combination, comprising a motor casing, a motor in said motor casing, a pump casing, a pump in said pump casing, the materials of said motor casing and pump casing being of different electromotive potential, and connecting means connecting said motor casing and pump casing together to form a unitary casing structure, said connecting means including means for insulating said motor casing from said pump casing, so that electrolytic action between said motor casing and pump casing is prevented when said unitary casing structure is immersed in a liquid capable of forming an electrolyte, said insulating means comprising an accurately dimensioned insulating ring whose inner periphery fits closely around a circular boss formed accurately at the end of one of said casings, and whose outer periphery fits closely within a circular recess formed accurately at the end of the other of said casings.

19. A submersible motor and pump combination, comprising a motor casing, a motor in said motor casing, a pump casing, a pump in said pump casing, the materials of said motor casing and pump casing being of different electromotive potential, and connecting means connecting said motor casing and pump casing together to form a unitary casing structure, said connecting means including means for insulating said motor casing from said pump casing, so that electrolytic action between said motor casing and pump casing is prevented when said unitary casing structure is immersed in a liquid capable of forming an electrolyte, said insulating means comprising an accurately dimensioned insulating ring whose inner periphery fits closely around a circular boss formed accurately at the end of one of said casings, and whose outer periphery fits closely within a circular recess formed accurately at the end of the other of said casings, and said insulating ring comprising three component rings, viz. an inner rectangular-section ring of insulating material and two outer L-section rings of metal, said L-section rings fitting accurately on diagonally opposite angles of said rectangular-section ring, the inner of said L-section rings fitting accurately around said boss and the outer fitting accurately within said recess.

20. A submersible motor and pump combination, comprising a motor casing, a motor in said motor casing, a pump casing, a pump in said pump casing, the materials of said motor casing and pump casing being of different electromotive potential, and connecting means connecting said motor casing and pump casing together to form a unitary casing structure, said connecting means including bolts of material having substantially the same electromotive potential as the material of one of said casings and means for insulating said bolts from the other casing, and said connecting means further comprising an accurately dimensioned insulating ring whose inner periphery fits closely around a circular boss formed accurately at the end of one of said casings and whose outer periphery fits closely within a circular recess formed accurately at the end of the other casing.

21. A submersible motor and pump combination, comprising a motor casing, a motor in said motor casing, said motor having a shaft, a pump casing, a pump in said pump casing, said pump having a shaft, the materials of said motor casing and pump casing being of different electromotive potentials, and the materials of said motor shaft and pump shaft being of different electromotive potentials, connecting means connecting said motor casing and pump casing together to form a unitary casing structure, said connecting means including means for insulating said motor casing from said pump casing to prevent electrolytic action between them when they are immersed in an ambient liquid capable of forming an electrolyte, said unitary casing structure having means for admitting the ambinet liquid to the interior thereof, and means for securing said motor shaft and said pump shaft together end-to-end, said last-named means comprising a body of hard insulating material located between said motor and pump shafts so as to take the end thrust between said shafts, and a surrounding body of soft insulating material connected to said motor and pump shafts by bonding, so as to be capable of transmitting torque between them, whereby said motor and pump shafts are insulated from one another and electrolytic action between them is prevented when they are subjected to said ambient liquid.

22. A submersible electric motor structure, comprising a motor casing, a shaft rotatably mounted within said casing, a rotor on said shaft, a stator surrounding said rotor and secured to said casing, motor bearings for said shaft, housings for said bearings secured to said casing, means permitting the ambient water in which the structure is submerged to enter said casing, said stator and rotor and the major part of the structure being made of magnetic metal and said bearing housings being made of low permeability metal which is of the same order of electrolytic electromotive force as said magnetic metal forming the major part of the structure, whereby said housings do not deleteriously affect the function of the motor and at the same time electrolytic action between said housings and the contiguous parts is prevented.

GILES PHILIP ELIOT HOWARD.
VICTOR IVANOFF.

REFERENCES CITED

The following references are of record in the file of this patent:

UNITED STATES PATENTS

| Number | Name | Date |
|---|---|---|
| 1,216,242 | MacDonald | Feb. 13, 1917 |
| 1,531,724 | Arutunoff | Mar. 31, 1925 |
| 2,001,649 | Arutunoff | May 14, 1935 |
| 2,055,480 | Coberly | Sept. 29, 1936 |
| 2,191,901 | Wallgren | Feb. 27, 1940 |
| 2,246,777 | Bordeaux et al. | June 24, 1941 |
| 2,251,816 | Arutunoff | Aug. 5, 1941 |
| 2,285,436 | Hoover | June 9, 1942 |
| 2,310,757 | Wagner | Feb. 9, 1943 |
| 2,400,192 | Coons | May 14, 1946 |

FOREIGN PATENTS

| Number | Country | Date |
|---|---|---|
| 195,257 | Great Britain | Mar. 29, 1923 |
| 494,601 | Great Britain | Oct. 28, 1938 |

OTHER REFERENCES

Ser. No. 383,003, Hilpert (A. P. C.), published May 18, 1943.